(12) United States Patent
Kesarwani et al.

(10) Patent No.: US 10,824,721 B2
(45) Date of Patent: Nov. 3, 2020

(54) DETECTING AND DELAYING EFFECT OF MACHINE LEARNING MODEL ATTACKS

(71) Applicant: International Business Machines Corporation, Armonk, NY (US)

(72) Inventors: Manish Kesarwani, Bangalore (IN); Atul Kumar, Bangalore (IN); Vijay Arya, Bangalore (IN); Rakesh R. Pimplikar, Nagpur (IN); Sameep Mehta, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 240 days.

(21) Appl. No.: 15/986,542

(22) Filed: May 22, 2018

(65) Prior Publication Data

US 2019/0362072 A1    Nov. 28, 2019

(51) Int. Cl.
*G06F 21/56* (2013.01)
*G06N 20/00* (2019.01)
*G06F 21/55* (2013.01)

(52) U.S. Cl.
CPC ............ *G06F 21/56* (2013.01); *G06N 20/00* (2019.01); *G06F 2221/033* (2013.01)

(58) Field of Classification Search
CPC .. G06F 21/56; G06F 2221/033; G06F 21/552; G06N 20/00
See application file for complete search history.

(56) References Cited

U.S. PATENT DOCUMENTS

| 9,479,516 B2 | 10/2016 | Mote et al. |
| 2014/0259189 A1 | 9/2014 | Ramachandran |

(Continued)

FOREIGN PATENT DOCUMENTS

| CN | 103064971 A | 4/2013 |
| CN | 104462509 A | 3/2015 |
| CN | 104463601 A | 3/2015 |

OTHER PUBLICATIONS

Battista Biggio et al., "Security Evaluation of Support Vector Machines in Adversarial Environments", Support Vector Machine Applications, Jan. 30, 2014, 48 pages, Cornell University Library.

(Continued)

*Primary Examiner* — Nelson S. Giddins
(74) *Attorney, Agent, or Firm* — Ference & Associates LLC

(57) ABSTRACT

One embodiment provides a method for delaying malicious attacks on machine learning models that a trained using input captured from a plurality of users, including: deploying a model, said model designed to be used with an application, for responding to requests received from users, wherein the model comprises a machine learning model that has been previously trained using a data set; receiving input from one or more users; determining, using a malicious input detection technique, if the received input comprises malicious input; if the received input comprises malicious input, removing the malicious input from the input to be used to retrain the model; retraining the model using received input that is determined to not be malicious input; and providing, using the retrained model, a response to a received user query, the retrained model delaying the effect of malicious input on provided responses by removing malicious input from retraining input.

13 Claims, 4 Drawing Sheets

(56) References Cited

U.S. PATENT DOCUMENTS

| | | | |
|---|---|---|---|
| 2014/0304814 A1 | 10/2014 | Ott et al. | |
| 2015/0262264 A1 | 9/2015 | Appel et al. | |
| 2017/0221111 A1 | 8/2017 | Salehi et al. | |
| 2018/0007084 A1* | 1/2018 | Reddy | H04L 63/1458 |
| 2018/0124085 A1* | 5/2018 | Frayman | G06N 20/20 |
| 2018/0293501 A1* | 10/2018 | Ambati | G06N 20/20 |
| 2019/0215329 A1* | 7/2019 | Levy | G06F 21/56 |
| 2019/0244103 A1* | 8/2019 | Wang | G06N 3/082 |
| 2019/0311149 A1* | 10/2019 | Margel | G06F 21/554 |
| 2019/0387005 A1* | 12/2019 | Zawoad | H04L 63/1441 |

OTHER PUBLICATIONS

Huayi Li et al., "Bimodal Distribution and Co-Bursting in Review Spam Detection", 2017 International World Wide Web Conference Committee (WWW 2017), Apr. 3-7, 2017, Perth, Australia, 10 pages, ACM Digital Library.

Huayi Li et al., "Modeling Review Spam Using Temporal Patterns and Co-bursting Behaviors", Nov. 21, 2016, 9 pages, available at: https://arxiv.org/pdf/1611.06625.pdf.

Santosh K C et al., "On the Temporal Dynamics of Opinion Spamming: Case Studies on Yelp", International World Wide Web Conference Committee (WWW 2016), Apr. 11-15, 2016, Montreal, Quebec, Canada, 11 pages, ACM Digital Library.

Geli Fei et al., Exploiting Burstiness in Reviews for Review Spammer Detection, Proceedings of the Seventh International AAAI Conference on Weblogs and Social Media, 2013, 10 pages, Association for the Advancement of Artificial Intelligence.

Stephan Gunnemann et al., "Detecting Anomalies in Dynamic Rating Data: A Robust Probabilistic Model for Rating Evolution", KDD '14, Aug. 24-27, 2014, New York, New York, USA, 10 pages, ACM Digital Library.

Sihong Xie et al., "Review Spam Detection via Temporal Pattern Discovery", KDD '12, Aug. 12-16, 2012, Beijing, China, 9 pages, ACM Digital Library.

Arjun Mukherjee et al., "Spotting Fake Reviewer Groups in Consumer Reviews", WWW 2012, Apr. 16-20, 2012, Lyon, France, 10 pages, ACM Digital Library.

Ee-Peng Lim et al., "Detecting Product Review Spammers using Rating Behaviors", CIKM '10, Oct. 26-30, 2010, Toronto, Ontario, Canada, 10 pages, ACM Digital Library.

* cited by examiner

DETECTING AND DELAYING EFFECT OF MACHINE LEARNING MODEL ATTACKS

BACKGROUND

Machine learning is the ability of a computer to learn without being explicitly programmed to perform some function. Thus, machine learning allows a programmer to initially program an algorithm that can be used to predict responses to data, without having to explicitly program every response to every possible scenario that the computer may encounter. In other words, machine learning uses algorithms that the computer uses to learn from and make predictions with regard to data. Machine learning provides a mechanism that allows a programmer to program a computer for computing tasks where design and implementation of a specific algorithm that performs well is difficult or impossible. To implement machine learning, the computer is initially taught using machine learning models from sample inputs. The computer can then learn from the machine learning model in order to make decisions when actual data are introduced to the computer.

Some applications utilize machine learning models that are continuously updated based upon received inputs or feedback. For example, a recommendation application may recommend certain products based upon feedback provided by other users. As an example, if users provide feedback indicating that a particular product performs well or performs poorly, the machine learning model can use this input or feedback to assist in making future recommendations. These machine learning models are continuously updated and retrained as new user inputs and feedback are received. This continuous updating allows for the machine learning model to adapt and provide responses that are based upon more current information.

BRIEF SUMMARY

In summary, one aspect of the invention provides a method for delaying the effect of malicious attacks on a machine learning model that is continuously retrained using input captured from a plurality of users, comprising: deploying a model, said model designed to be used with an application, for responding to requests received from users, wherein the model comprises a machine learning model that has been previously trained using a data set; replicating the deployed model to create a plurality of replicated machine learning models; receiving input from one or more users, wherein the received input comprises malicious input; randomly selecting a subset of machine learning models from the plurality of replicated machine learning models, so that some remaining models in the plurality of replicated machine learning models are not retrained; retraining the models in the selected subset of machine learning models using the received input; and providing a response to a user query, wherein the response employs an ensemble machine learning model comprising both (i) the retrained models in the selected subset of machine learning models and (ii) the remaining replicated machine learning models that were not retrained, the ensemble machine learning model delaying the effect of the malicious input on provided responses by using a consensus response approach.

A further aspect of the invention provides a method for delaying the effect of malicious attacks on a machine learning model that is continuously retrained using input captured from a plurality of users, comprising: deploying a model, said model designed to be used with an application, for responding to requests received from users, wherein the model comprises a machine learning model that has been previously trained using a data set; receiving input from one or more users; determining, using a malicious input detection technique, if the received input comprises malicious input; if the received input comprises malicious input, removing the malicious input from the input to be used to retrain the model; retraining the model using received input that is determined to not be malicious input; and providing, using the retrained model, a response to a received user query, the retrained model delaying the effect of malicious input on provided responses by removing malicious input from retraining input.

Another aspect of the invention provides an apparatus for delaying the effect of malicious attacks on a machine learning model that is continuously retrained using input captured from a plurality of users, comprising: at least one processor; and a computer readable storage medium having computer readable program code embodied therewith and executable by the at least one processor, the computer readable program code comprising: computer readable program code configured to deploy a model, said model designed to be used with an application, for responding to requests received from users, wherein the model comprises a machine learning model that has been previously trained using a data set; computer readable program code configured to receive input from one or more users; computer readable program code configured to determine, using a malicious input detection technique, if the received input comprises malicious input; computer readable program code configured to, if the received input comprises malicious input, remove the malicious input from the input to be used to retrain the model; computer readable program code configured to retrain the model using received input that is determined to not be malicious input; and computer readable program code configured to provide, using the retrained model, a response to a received user query, the retrained model delaying the effect of malicious input on provided responses by removing malicious input from retraining input.

An additional aspect of the invention provides a computer program product for delaying the effect of malicious attacks on a machine learning model that is continuously retrained using input captured from a plurality of users, comprising: a computer readable storage medium having computer readable program code embodied therewith, the computer readable program code executable by a processor and comprising: computer readable program code configured to deploy a model, said model designed to be used with an application, for responding to requests received from users, wherein the model comprises a machine learning model that has been previously trained using a data set; computer readable program code configured to receive input from one or more users; computer readable program code configured to determine, using a malicious input detection technique, if the received input comprises malicious input; computer readable program code configured to, if the received input comprises malicious input, remove the malicious input from the input to be used to retrain the model; computer readable program code configured to retrain the model using received input that is determined to not be malicious input; and computer readable program code configured to provide, using the retrained model, a response to a received user query, the retrained model delaying the effect of malicious input on provided responses by removing malicious input from retraining input.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
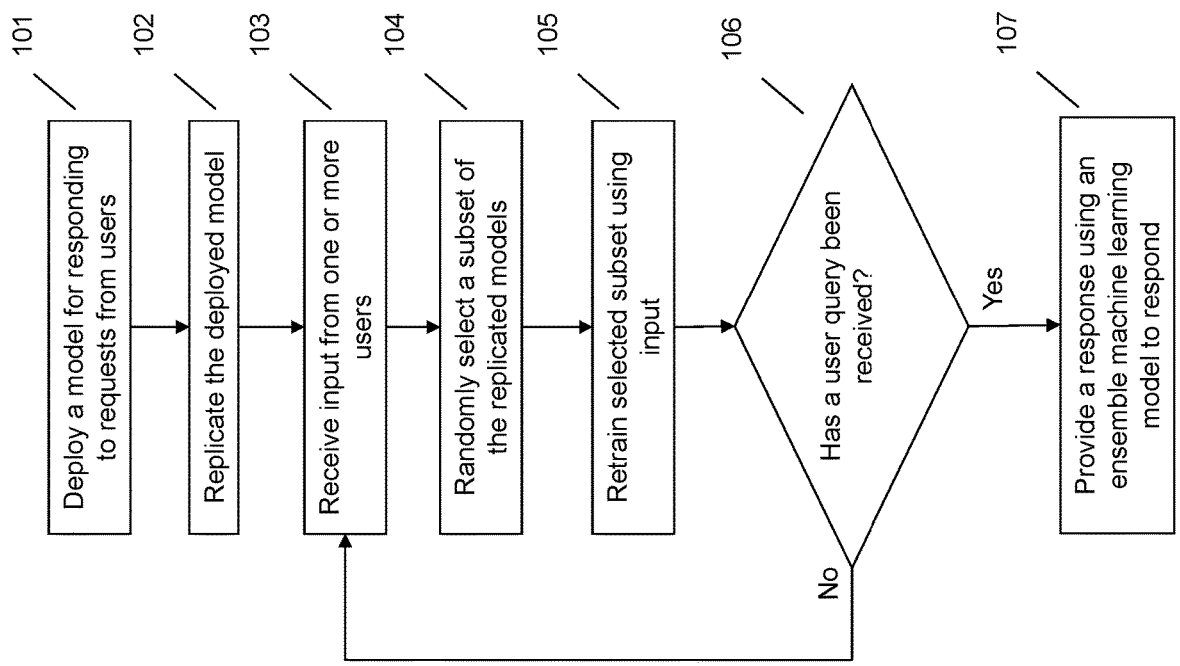
FIG. 1 illustrates a method of delaying effects of a machine learning model attack using replicated machine learning models.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Crowdsourcing, or receiving input from a plurality of users regarding a product, application, or service, to train a machine learning model is an effective technique for training a model where the data distribution is not known at the time the model is created. This technique also provides a method that allows the model to adapt to the desired environment or context that the model is being used in. For example, if the model is deployed in a recommendation engine, the model can be adapted to provide recommendation on many different products or services that may be introduced after the model is deployed. However, since the machine learning models can be trained using input received from users, users can provide input that retrains the model to provide responses that are incorrect or inaccurate. In other words, users can attack the model to make the model respond in a manner that is inconsistent with the intended purpose of the model. Such an attack is also referred to as "poisoning" or "thwarting" the machine learning model. The user purposely manipulates the training data so that the machine learning model does not respond correctly.

As an example of poisoning a machine learning model, if the machine learning model is used with an image identifier application and a user wants to manipulate the responses provided by the model, the user can provide input or feedback incorrectly labeling images, thereby causing the machine learning model to incorrectly identify images. For example, if a user provides a label for an image of a duck identifying the image as a bus, the machine learning model will use this information for retraining. If enough feedback is received where the duck is labeled as a bus, the machine learning model will start identifying images of ducks as busses. As another example, if users provide, to a movie recommender model, a low rating for an accurately recommended movie, the model will eventually be retrained so that the movie is no longer recommended in the category that it had previously been recommended in. Users can also collude to retrain the model, meaning that a group of users provide similar feedback in order to artificially raise or degrade ratings or shift the model to provide incorrect responses. This feedback or input that is intended to purposely incorrectly retrain the model is referred to as malicious feedback or input.

One traditional approach for assisting in preventing retraining of the model using malicious feedback or input is to identify if the feedback may be fraudulent. For example, a conventional system may analyze the feedback or input to determine if the feedback or input contains some comments or ratings that may indicate that the feedback is fraudulent. For example, a conventional system may detect that the provided rating is an extreme rating, but that the included comments are nonsensical or not related to the product or service being rated. This may indicate that the rating is fraudulent. However, this does not identify that feedback is malicious if the comments appear to be germane to the product or service. Thus, the user can simply provide comments that appear to be germane, while providing the malicious feedback. Other conventional systems may attempt to identify the user providing the feedback and determine if that user has a history of providing fraudulent feedback. Using this technique the system keeps a history of all users. Also, users who have not previously provided feedback may be blocked from providing feedback even if the feedback is actually genuine. Thus, the conventional systems suffer from the inability to correctly identify malicious feedback. Additionally, the conventional systems are unable to correct the model if malicious feedback is received and is used to retrain the model.

Another traditional approach requires that people monitor the machine learning models. The people either have to continuously monitor the feedback or input that is used to retrain the machine learning model and remove feedback or input that is determined to be malicious or continuously monitor the responses of the machine learning model. If a person determines that the machine learning model is responding in an incorrect manner, the person either has to reset the machine learning model to an uninfected state or remove the machine learning model from the system so that it can no longer provide incorrect or inaccurate responses. However, this conventional technique is very time consuming and labor intensive. Additionally, since malicious attacks can occur in a very short time period, the machine learning model may be able to provide some inaccurate responses before it is corrected. Depending on the purpose of the machine learning model, even a short time where inaccurate responses are provided may be extremely detrimental.

Accordingly, the techniques and systems as described herein provide a system and technique for delaying the effect of malicious input on a machine learning model. The system may deploy a model, in conjunction with an application, that responds to requests or queries provided by users. The model may include a machine learning model that is trained using input received from users, also referred to as crowdsourcing the training of the machine learning model. In order to delay an effect of malicious input, one system may replicate the machine learning models into a plurality of replicated machine learning models. These replicated models are copies of the original machine learning model. As input that would be used to train the model is received from users, the system randomly selects a subset of the replicated machine learning models. The received input is then used to retrain only this randomly selected subset of the machine learning models. Thus, since only a portion of the machine learning models were retrained using the input, if the input was malicious, only a subset of machine learning models are infected with the malicious input. Then, as queries or requests are received from users, the system uses an ensemble machine learning model approach to respond to the queries or requests. The ensemble machine learning model includes both the models that were retrained using the input and the models that were not retrained. Thus, since only a portion of the machine learning models were retrained using the input, even if the input was malicious, the response provided by the ensemble machine learning model will not be an inaccurate response. In other words, the effect of the malicious input is delayed until a majority of the models become infected.

Another technique for delaying the effect of malicious input is to identify if the input is malicious before using it to retrain the machine learning model. Using this technique, the deployed machine learning model is not replicated. Instead, the system includes a time delay that is implemented between receipt of the input and use of the input to retrain the model. During this time delay, the system can determine whether the received input is malicious using one or more malicious input detection techniques, for example, a temporal detection technique, a label detection technique, a user detection technique, a collusion detection technique, or a combination thereof. If the input is determined to be malicious, the system removes the malicious input from the training input and, thereafter, retrains the model using the input that is not determined to be malicious. This retrained model can then be used to provide responses to received queries without having an effect of the malicious input.

Such a system provides a technical improvement over current systems for training machine learning models using user feedback or input. The described systems and methods allow for delaying the effect of malicious input on the machine learning models. Using one technique, instead of immediately retraining the entire machine learning model using malicious input, as in conventional systems, the described systems only trains a subset of replicated machine learning models using any received input. Therefore, the incorporation of malicious input is delayed to the entirety of the machine learning model, thereby allowing time for a person or other system to determine if malicious input has infected the machine learning model. Therefore, unlike conventional systems, even if the described system receives malicious input, the malicious input will not drastically shift the machine learning model so that it provides incorrect or inaccurate responses. Additionally, the described systems and methods provide a technique for detecting whether input may be malicious and, upon determining that the feedback is or may be malicious, not incorporating the malicious feedback into the retraining of the machine learning model. Such a technique prevents the malicious feedback from being incorporated into the retraining of the machine learning model at all.

Therefore, the systems and methods as described herein provide a technique for delaying infection of the machine learning model, either by detecting input is malicious and preventing incorporation of the malicious feedback into the training of the model or by using an ensemble machine learning model approach and also correcting any possible infection that has been introduced to the machine learning model, which is not possible using conventional techniques. Accordingly, the described systems and methods provide a technique for training machine learning models using user input that results in retrained machine learning models that are more resistant to malicious attacks than conventional systems. Additionally, the described systems and methods reduce the time and resources of people who would be needed to continuously monitoring the machine learning models using conventional systems.

FIG. 1 illustrates a method for delaying the effect of malicious attacks on a machine learning model that is continuously retrained using input captured from a plurality of users using a replicated machine learning model approach. This type of technique may be employed in systems where having a delay between receiving the input and retraining the model is unacceptable or not feasible. For example, this type of system may be deployed when users expect to see input incorporated and changes resulting from the incorporated input immediately. At 101 the system may deploy a model for responding to requests received from users. The model may include a machine learning model that is trained using input captured from a plurality of users, or, in other words, trained using crowdsourcing techniques. The model may be deployed in conjunction with an application. For example, an application may include a recommendation engine which uses a machine learning model to provide recommendations. As another example, an application may be an image analysis application that includes an image classification engine that uses a machine learning model to classify or label different images or portions of images. In other words, the application may employ a machine learning model to perform a function of the application.

The machine learning model may include a model that is continuously retrained using input received from users. For example, users may provide feedback to a movie recommendation model regarding the quality of a recommendation provided by the model. As another example, users may leave feedback or reviews regarding a purchased product. The model may use this feedback or reviews to provide recommendations regarding products to purchase. As a final example, users may provide input to a spam filter model, network intrusion detection model, malware detection model, or the like, that identifies activities as spam, network intrusion, malware, or the like, respectively. The model may then use this information to identify subsequent activities as being spam, network intrusions, malware, or the like.

Continuous retraining does not mean that the model is retrained every time input is received. Rather, the models may be trained at predetermined time periods using input that has been received since the last time that the model was retrained. For example, the system may collect input for a predetermined period of time and then, upon expiration of that period of time, may use the input to retrain the model. As another example, the system may collect input until a predetermined number of inputs have been received and then use the inputs to retrain the model. In other words, continuous training means that the machine learning model is periodically retrained after the model has been deployed.

At 102 the system may replicate the deployed model to create a plurality of replicated machine learning models. This replication results in a plurality of machine learning models that are the same. The replication may occur when the model is first deployed, thereby resulting in a number of replicated models that are considered "good" or "clean," meaning that the models have not been retrained using received input, and, more specifically, have not be retrained using malicious input. The number of replicated models may vary depending on the application, but may include only a couple of replicated models or may include hundreds of replicated models.

At 103 the system may receive input from one or more users. This input may include the feedback or reviews provided by users. In other words, this input may include training input that will be used to retrain the machine learning model. The input may include malicious input that would affect the results or responses of the machine learning model. Thus, to minimize or mitigate the effect of the malicious input on the machine learning model, only a subset of the machine learning models may be trained using any input, included non-malicious input. Therefore, at 104 the system may randomly select a subset of models from the replicated models. The number of models included in the subset may include any number less than the total number of replicated models, but may be less than half of the total number of replicated models.

The system may then use the received input to retrain the selected subset of models at 105. In this manner, if the input is malicious, only a subset of the models is infected with the malicious input. As new inputs (to be used as training input) are received a new subset of machine learning models are randomly selected for retraining. Since the subset is randomly selected, the new subset may include models that were a part of the last subset or may include completely different models. After retraining the models, if a user query is not received at 106, the system may continue to retrain subsets of models using received input at 103. If, however, the system identifies that a user query has been received at 106, the system may respond to the user query using an ensemble machine learning model at 107. The ensemble machine learning model includes not only the machine learning models that were retrained using the input, but also the machine learning models that were not retrained using the input. The ensemble machine learning model may use a consensus from the machine learning models included in the ensemble in order to provide a response or prediction. Therefore, if the input was malicious, the response of the machine learning model will still be accurate because not enough of the machine learning models are infected to make the response inaccurate. Thus, the effect of the malicious input is delayed unless and until enough of the machine learning models included in the ensemble machine learning model are infected.

A user or the system may periodically verify the status or state of one or more of the replicated machine learning models. If, after verification, the user or system determines that the machine learning model is "clean", meaning that it is not infected with any malicious input, the user or system may mark that state of the model as a "good" or "clean" state. This state may also be stored in memory as a previous version of the machine learning model. The system may use these previous versions to further assist in preventing malicious input from poisoning the machine learning models. For example, the system may randomly reset a selected subset of the machine learning models to a previous clean version. Thus, if one of the models included in the randomly selected subset was infected, it would be reset to a clean, uninfected version or state. This random resetting also ensures that the entire system will not be poisoned. In other words, even if all of the models that were reset were uninfected models, the fact that the models were reset ensures that the entire system cannot become infected. The ensemble machine learning model would therefore include not only the models that have been retrained and the models that were not retrained, but also the reset models. Additionally, the system may use the previously identified clean version of the model if a model is identified as being infected. For example, the system may correct the model by resetting the model to a previously marked clean state model.

Figure 2:
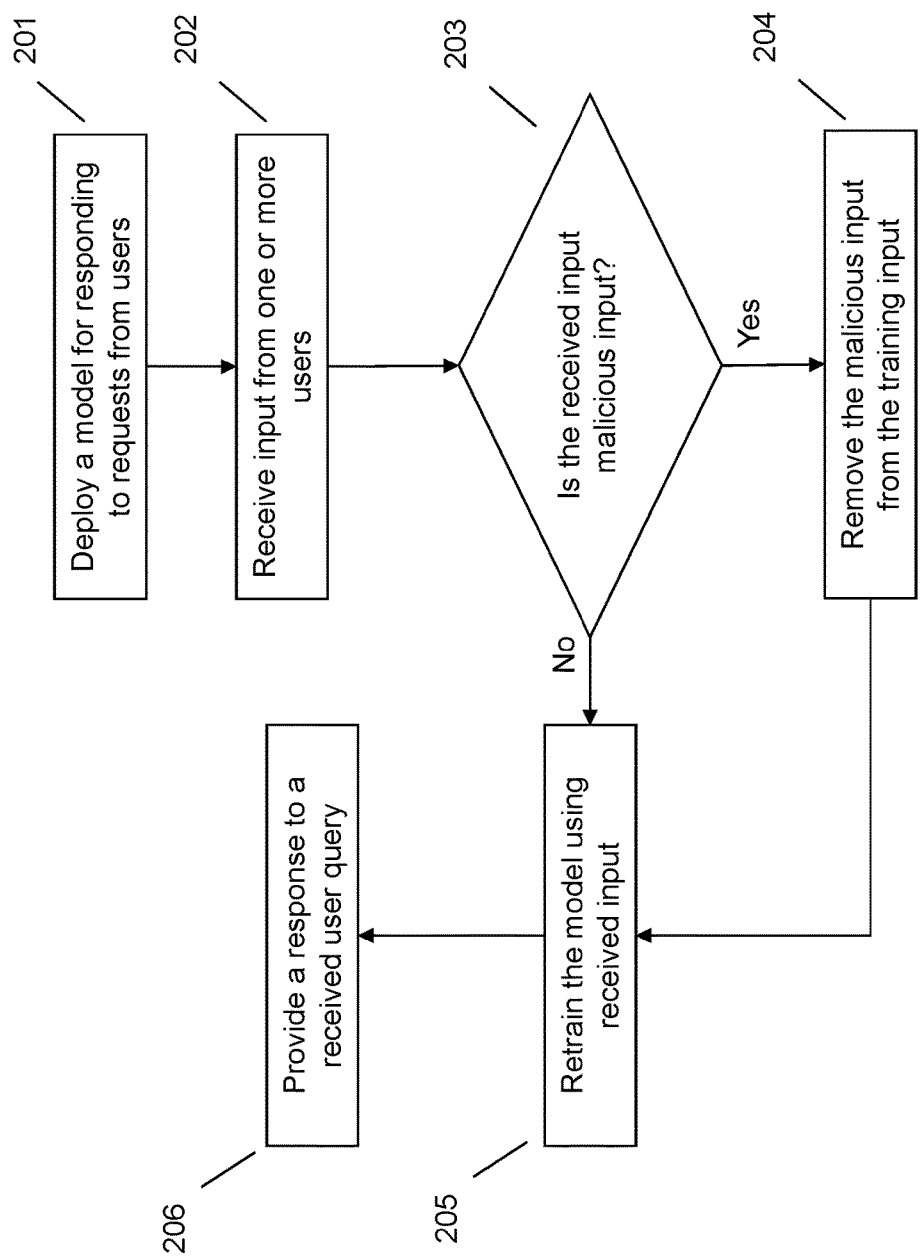
FIG. 2 illustrates a method of delaying effects of a machine learning model attack by identifying input as malicious.

FIG. 2 illustrates a method for delaying the effect of malicious attacks on a machine learning model that is continuously retrained using input captured from a plurality of users using a malicious input detection technique. This type of technique may be employed in systems where having a delay between receiving the input and retraining the model is acceptable. For example, this type of system may be deployed when users would not expect to see input incorporated and changes resulting from the incorporated input immediately. At 201 the system may deploy a model for responding to requests received from users. The description of the deployed model as explained in conjunction with 101 is applicable and will not be restated here. At 202 input may be received from one or more users. The description of this input as explained in conjunction with 103 is application and will not be restated here.

However, unlike the technique explained in conjunction with FIG. 1, this technique does not include replicated machine learning models. Additionally, unlike the technique explained in conjunction with FIG. 1, this technique incorporates a delay between receipt of the input and retraining of the machine learning model using the received input. The amount of delay that is needed may be application dependent and can be calculated from the normal rate of arrival of inputs and other requirements, for example, sensitivity of users to seeing changes occurring in real-time, frequency of manual review of the machine learning model, and the like. During the delay, the technique of FIG. 2, determines, upon receipt of the user input, whether the input is or may be malicious input at 203. To determine if the input is malicious, the system may use one or a combination of malicious input detection techniques, for example, a temporal detection technique, a label detection technique, a user detection technique, a collusion detection technique, a combination of one or more of these techniques, or the like.

In some poisoning attacks, a person, or group of people, attempts to provide a large volume of feedback or inputs having an extreme nature. An input having an extreme nature includes input that would be considered an outlier or an input that is at one extreme or the other of a scale. For example, if the feedback is a rating on a scale from 1 to 10, an extreme rating would be a 1 rating or a 10 rating. As another example, if the feedback is a label, for example, for an image identifier, an extreme input may include a label that is very different than previously received inputs or a default setting. For example, a label provided by a user that identifies an image of a duck as a bus may be considered an extreme input. Therefore, a temporal detection technique may include identifying a time period for receipt of a plurality of inputs. The technique may identify a number of inputs that are received during that time period and may also identify a nature of the inputs, for example, whether the inputs are extreme. If a large number of inputs are received during this time period, for example, over a predetermined threshold, the system may further verify the input. In other words, if the system receives a surge of inputs within a predetermined time period, the system may flag the inputs for further review. If, upon further verification or review, the system determines that some or all of these inputs have an extreme nature, the system may mark or classify the received input as possibly being malicious input.

To determine whether the number of inputs received during a time period is abnormal or over a predetermined threshold, the system may set the predetermined threshold as corresponding to a "normal" or usual rate of received inputs during a similar time period. For example, if the system uses a time period of a single twenty-four hour period and the usual rate of received inputs during a normal twenty-four hour period is one hundred inputs, upon receiving one thousand inputs during a twenty-four hour period the system may determine that this is abnormal or over the predetermined threshold corresponding to a typical similar time period. Some events may occur that result in an abnormal number of genuine feedback or input. For example, if an application re-launches, an application malfunctions, a product is recalled, serious complaints are received regarding a product, or the like, this event may result in an abnormally high volume of received inputs. Therefore, the system may compare the time period that received a high number of inputs to other sources to determine if some event may have occurred that may have resulted in an abnormal number of genuine inputs. If the system determines that such an event may have occurred, the system may not mark the inputs as malicious.

Another malicious input detection technique may include a label detection technique that identifies if the labels or inputs received are extreme in nature. To determine if a label or input is extreme, the system may build a distance matrix for labels using a distance matrix method. The system may then determine a threshold for declaring two labels as opposites or extremes of one another. This threshold can be automatically learned by the system. Therefore, to classify a received label as extreme the system may determine a distance between a current label (e.g., the current average rating, the current image label, etc.) associated with the model and the label included in the received input. If the distance is above a predetermined threshold, the system may mark the received input as being extreme in nature. The system may then classify the received input as malicious.

Other malicious input detection techniques may be used, for example, a user detection technique or a collusion detection technique. These techniques are similar except that the user detection technique is directed toward a single user and the collusion detection technique is directed to a group of individuals. Some users may work as a group, or collude, to poison the machine learning model. For example, instead of a single individual providing a large number of malicious inputs, a group of individuals work together to provide a large number of malicious inputs. Therefore, in either the user detection or the collusion detection technique, the system may access historical information associated with the individual or group of individuals that identifies the nature of previously provided inputs. If the system determines that the individual or group of individuals have previously provided malicious inputs, the system may mark or classify the inputs provided by the individual or group of individuals as malicious.

If the system identifies the input as malicious or possibly being malicious at 203, the system may remove the malicious input from the training input, or input used to retrain the model, at 204. The malicious input may be removed altogether or may simply be segregated from the training input and marked for further review, for example, further manual review or review using another malicious input detection technique. Once the malicious input has been removed from the training input at 204, or if the received input is not identified as malicious at 203, the system may retrain the model using the received input at 205, specifically, the received input that is not malicious or marked as possibly malicious. When user queries are thereafter received, the system can provide a response to the user query at 206 using the retrained model. As with the technique as described in FIG. 1, this technique may also include identifying clean states of the model as it is retrained. Thus, if the model is accidentally retrained using malicious input, for example, the malicious input was not identified as malicious, the system can correct the model by resetting the model to a previously identified clean state or version. The system may also periodically reset the model to ensure that the model is not infected.

Figure 3:
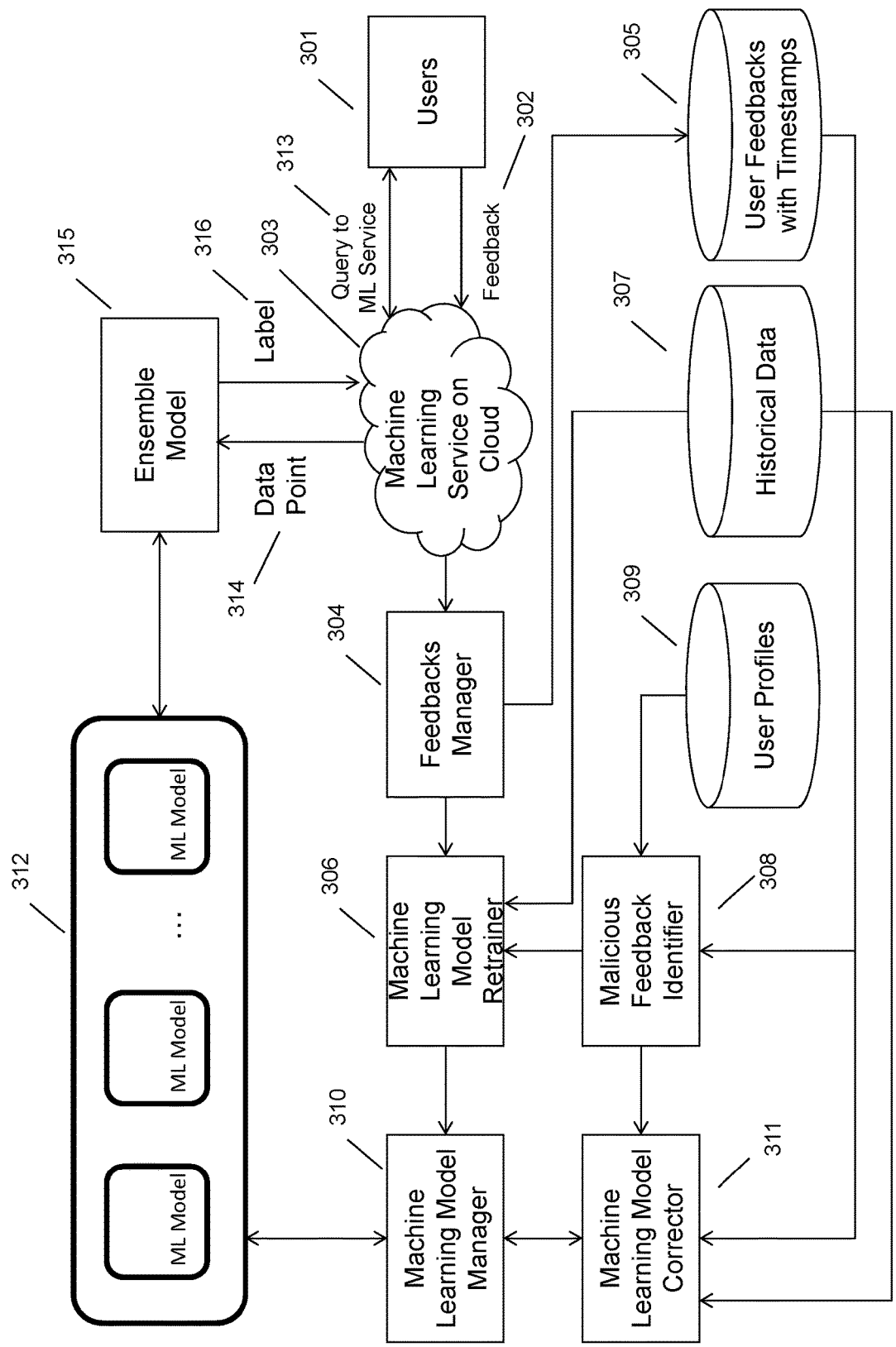
FIG. 3 illustrates an example system for delaying machine learning model attacks.

It should be understood that a single machine learning model system may employ both techniques described in FIG. 1 and FIG. 2. For example, the system may include a plurality of replicated models, as in the technique of FIG. 1, and a subset of those replicated models may provide responses using the technique described in FIG. 2. Accordingly, FIG. 3 illustrates an overview of a system for delaying the effect of malicious input provided to a machine learning model where the system includes components for both of the techniques. One or more users 301 may provide feedback 302 to a machine learning model service that is deployed over a cloud service provider 303. The feedback may be transmitted to the feedback manager 304 that sends the feedback to be marked with a timestamp and stored in a data storage location 305. The feedback manager 304 also sends the feedback to the machine learning model retrainer 306.

The machine learning model retrainer 306 retrains the machine learning model(s) using different information, for example, the feedback received from the feedbacks manager 304. The machine learning model retrained 306 also uses historical information regarding the machine learning models previously stored in a historical data storage location 307. Depending on the technique, the machine learning model may also use information received from the malicious feedback identifier 308. The malicious feedback identifier 308 is responsible for identify if the feedback is malicious using different malicious input detection techniques and sources, for example, information related to user profiles 309, information related to the timestamps of the feedback 305, and the like. Thus, the feedback received at the machine learning model retrainer 306 may only include feedback that is not identified as malicious by the malicious feedback identifier 308.

The system may also include a machine learning model manager 310 that manages the machine learning models, for example, the machine learning models that are retrained by the machine learning model retrainer 306, the machine learning models that are corrected using the machine learning model corrector 311, or the like. The machine learning model corrector 311 may be used to correct or reset any machine learning models to a "clean" state. This correction or reset may be responsive to identification that a model has been infected or may just be a periodic reset. The machine learning model corrector 311 may also use inputs from the historical data store 307 and the user feedback with timestamps data store 305. The machine learning model manager 310 may update the machine learning model(s) 312 used to respond to user queries 313. In the case of replicated machine learning models, upon receipt of a user query 313 the system may provide the data point or query 314 to the ensemble model 315 that is associated with multiple machine learning models 312. The ensemble model then returns a label or response 316 to the machine learning service 303, which is then provided to the user 313. Otherwise, in the case of a single machine learning model 312, the machine learning service may provide a response to the query 313 using the machine learning model.

Thus, the systems and methods as described herein provide a technique for delaying the effect of malicious inputs on a machine learning model. Rather than the machine learning model being able to be poisoned or shifted from an attack, as in conventional systems, the described system allows for a delayed effect which may allow for time for the system to be reset before the entire system is infected with malicious input. Additionally, rather than a person having to continuously monitor the machine learning model to ensure that it has not been infected, as in conventional systems, the described system and methods provide a technique that allows for less time and resources to be spent monitoring machine learning models for infection.

Figure 4:
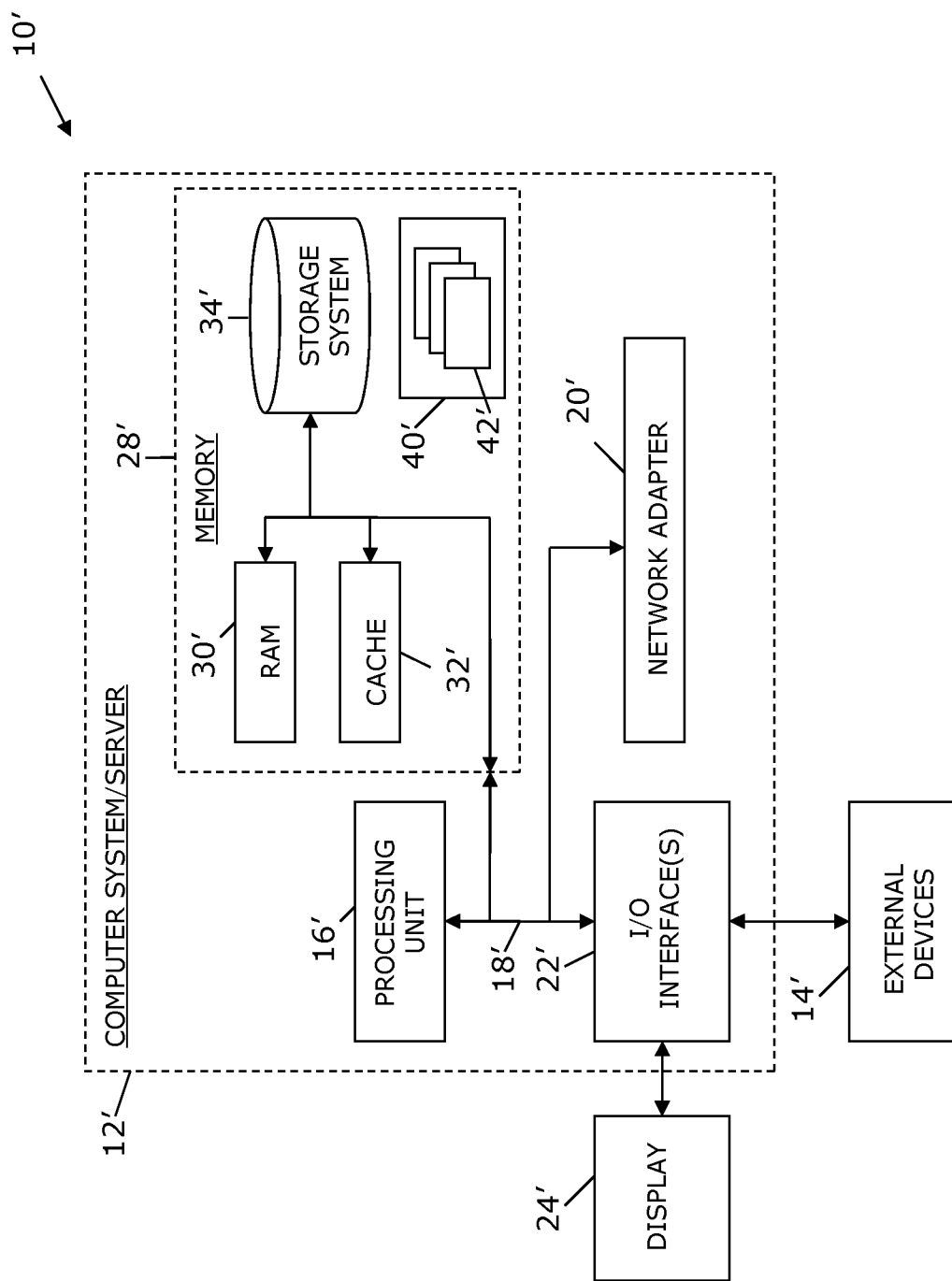
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for delaying the effect of malicious attacks on a machine learning model that is continuously retrained using input captured from a plurality of users, comprising:
    deploying a model, said model designed to be used with an application, for responding to requests received from users, wherein the model comprises a machine learning model that has been previously trained using a data set;
    receiving input from one or more users, wherein the input is queued for retraining the machine learning model;
    determining, using a malicious input detection technique, the received input comprises malicious input, wherein the malicious input detection technique at least comprises a temporal detection technique, wherein the temporal detection technique comprises (i) identifying a time period, (ii) identifying the number of inputs received during the identified time period, (iii) determining a nature of the input received during the identified time period, and (iv) classifying the received input as malicious if the identified number of inputs received during the identified time period exceeds a predetermined threshold and the received inputs are determined to have an extreme nature, wherein the predetermined threshold comprises a threshold corresponding to a usual rate of received user input for a predetermined time period similar to the identified time period;
    removing the malicious input from input queued for retraining the model;
    retraining the model using the input queued for retraining the model without the malicious input; and
    providing, using the retrained model, a response to a received user query, the retrained model delaying the effect of malicious input on provided responses by removing malicious input from the input queued for retraining the model.

2. The method of claim 1, wherein the malicious input detection technique further comprises at least one additional technique selected from the group consisting of: a label detection technique, a user detection technique, and a collusion detection technique.

3. The method of claim 2, wherein the at least one additional technique comprises a label detection technique comprising (i) identifying a current label corresponding to the application, (ii) determining the received input comprises a label outside a predetermined threshold from the current label, and (iii) classifying the received input as malicious.

4. The method of claim 2, wherein the at least one additional technique comprises a user detection technique comprising (i) accessing historical information regarding a user providing the received input and (ii) classifying the received input as malicious if the user is identified as having provided past malicious input.

5. The method of claim 2, wherein the at least one additional technique comprises a collusion detection technique comprising (i) accessing historical information regarding a plurality of users providing the received input and (ii) classifying the received input as malicious if the plurality of users are identified as having previously colluded to provide malicious input.

6. The method of claim 1, comprising correcting the model by resetting the model to a state previously identified as a clean state comprising a retrained model state known to have not been retrained using malicious input.

7. The method of claim 6, wherein the correcting is responsive to identifying the model was retrained using malicious input.

8. An apparatus for delaying the effect of malicious attacks on a machine learning model that is continuously retrained using input captured from a plurality of users, comprising:
    at least one processor; and
    a computer readable storage medium having computer readable program code embodied therewith and executable by the at least one processor, the computer readable program code comprising:
    computer readable program code configured to deploy a model, said model designed to be used with an application, for responding to requests received from users, wherein the model comprises a machine learning model that has been previously trained using a data set;
    computer readable program code configured to receive input from one or more users, wherein the input is queued for retraining the machine learning model;
    computer readable program code configured to determine, using a malicious input detection technique, the received input comprises malicious input, wherein the malicious input detection technique at least comprises a temporal detection technique, wherein the temporal detection technique comprises (i) identifying a time period, (ii) identifying the number of inputs received during the identified time period, (iii) determining a nature of the input received during the identified time period, and (iv) classifying the received input as malicious if the identified number of inputs received during the identified time period exceeds a predetermined threshold and the received inputs are determined to have an extreme nature, wherein the predetermined threshold comprises a threshold corresponding to a usual rate of received user input for a predetermined time period similar to the identified time period;
    computer readable program code configured to remove the malicious input from input queued for retraining the model;
    computer readable program code configured to retrain the model using the input queued for retraining the model without the malicious input; and
    computer readable program code configured to provide, using the retrained model, a response to a received user query, the retrained model delaying the effect of malicious input on provided responses by removing malicious input from the input queued for retraining the model.

9. A computer program product for delaying the effect of malicious attacks on a machine learning model that is continuously retrained using input captured from a plurality of users, comprising:

a computer readable storage medium having computer readable program code embodied therewith, the computer readable program code executable by a processor and comprising:

computer readable program code configured to deploy a model, said model designed to be used with an application, for responding to requests received from users, wherein the model comprises a machine learning model that has been previously trained using a data set;

computer readable program code configured to receive input from one or more users, wherein the input is queued for retraining the machine learning model;

computer readable program code configured to determine, using a malicious input detection technique, the received input comprises malicious input, wherein the malicious input detection technique at least comprises a temporal detection technique, wherein the temporal detection technique comprises (i) identifying a time period, (ii) identifying the number of inputs received during the identified time period, (iii) determining a nature of the input received during the identified time period, and (iv) classifying the received input as malicious if the identified number of inputs received during the identified time period exceeds a predetermined threshold and the received inputs are determined to have an extreme nature, wherein the predetermined threshold comprises a threshold corresponding to a usual rate of received user input for a predetermined time period similar to the identified time period;

computer readable program code configured to remove the malicious input from input queued for retraining the model;

computer readable program code configured to retrain the model using the input queued for retraining the model without the malicious input; and computer readable program code configured to provide, using the retrained model, a response to a received user query, the retrained model delaying the effect of malicious input on provided responses by removing malicious input from the input queued for retraining the model.

10. The computer program product of claim 9, wherein the malicious input detection technique further comprises a label detection technique comprising (i) identifying a current label corresponding to the application, (ii) determining the received input comprises a label outside a predetermined threshold from the current label, and (iii) classifying the received input as malicious.

11. The computer program product of claim 9, wherein the malicious input detection technique further comprises a user detection technique comprising (i) accessing historical information regarding a user providing the received input and (ii) classifying the received input as malicious if the user is identified as having provided past malicious input.

12. The computer program product of claim 9, wherein the malicious input detection technique further comprises a collusion detection technique comprising (i) accessing historical information regarding a plurality of users providing the received input and (ii) classifying the received input as malicious if the plurality of users are identified as having previously colluded to provide malicious input.

13. The computer program product of claim 9, comprising correcting the model by resetting the model to a state previously identified as a clean state comprising a retrained model state known to have not been retrained using malicious input.

\* \* \* \* \*